E. C. KENNY.
HORSESHOE.
APPLICATION FILED JAN. 29, 1916.
1,349,888.
Patented Aug. 17, 1920.
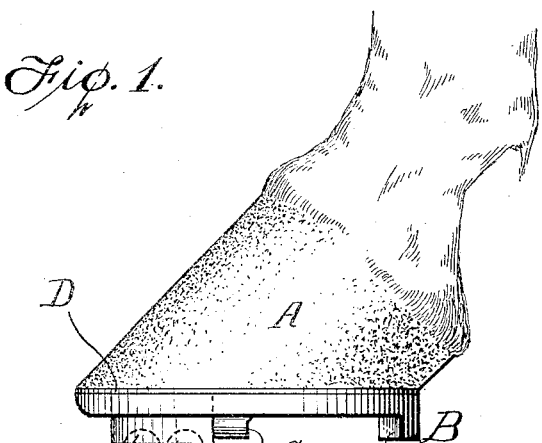
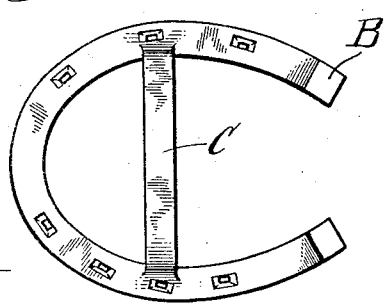
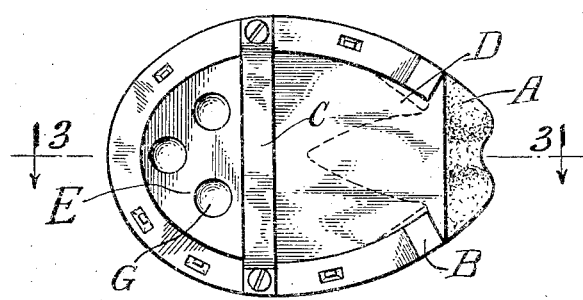
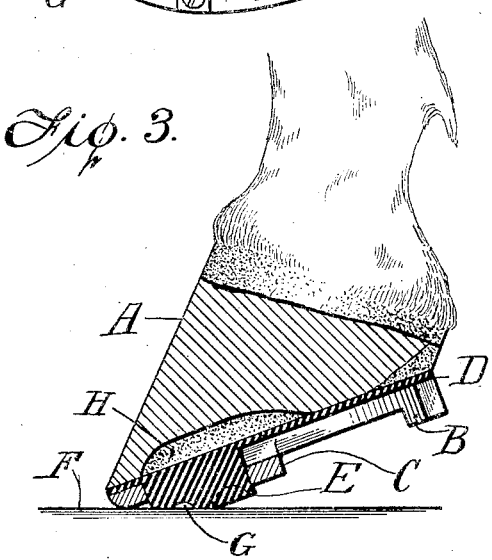
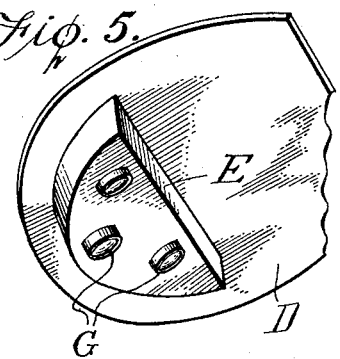
Inventor
Edward C. Kenny

UNITED STATES PATENT OFFICE.

EDWARD C. KENNY, OF BROOKLYN, NEW YORK.

HORSESHOE.

1,349,888. Specification of Letters Patent. Patented Aug. 17, 1920.

Application filed January 29, 1916. Serial No. 75,167.

*To all whom it may concern:*

Be it known that I, EDWARD C. KENNY, a citizen of the United States, residing at 155 Remsen street, in the borough of Brooklyn, county of Kings, city and State of New York, have invented new and useful Improvements in Horseshoes, of which the following is an exact, clear, and full description.

It is well known in the art that in pulling a heavy load a horse frequently tilts the heel of its shoe up so that the toe sinks into the traffic surface and furnishes a better foothold to assist the effort of the horse to pull the load. When pulling a heavy load on a smooth or hard and slippery surface, such as wet or icy asphalt, the shoe does not sink into the surface to provide a better foothold, the effort of the horse is not properly assisted, and the shoe therefore slips frequently resulting in serious injury to the horse and the loss of confidence of the horse and consequently slow progress. A common form of injury to the horse resulting from constant slipping is commonly called "cockled ankles," that is, a weakening of the muscles and tendons of the ankles which causes the hoof to turn under and backward, sometimes resulting in permanent injury to the horse.

It is also important to provide the horse with shoes which will prevent slipping and provide a secure foothold while traveling down inclined roadways, where the load is tending to push the horse before it, thus providing another requirement to be met in the construction of the shoe.

Many forms of shoes and anti-skid pads have been constructed in which the material intended to prevent slipping has been placed at the heel of the shoe, but it will be readily seen that in drawing a heavy load and raising the heel of the hoof so as to secure a foothold with the toe, this form of heel pad or anti-skid shoe would fail of its purpose.

Therefore one object of my invention is to provide a horseshoe which will prevent slipping and sliding on icy or other slippery surfaces and to relieve the jar to joints and bones.

It is well known among horsemen that the natural movement of the horse's hoof as it is lifted and carried forward for a foothold should take a course which may be represented by the arc of a circle. If the weight of the shoe used, however, is not properly distributed this course may be consequently altered to an unnatural course causing unnecessary strain to the muscles and frequently lameness, interference of hoof with ankle or leg and the striking of the hind shoe or hoof against the heel of the front hoof, resulting in serious bruises. The natural action of the horse's hoof in walking when raised from the ground in a rearwardly extended position is to turn backward and upward hinging from the ankle joint, and as the hoof is moved forward for a new foothold the weight of the hoof and its momentum, combined with muscular action, cause it to swing forward from the ankle joint to a proper angle to permit the toe of the hoof or shoe to touch the traffic surface first and finally the heel descends and a complete firm foothold is secured.

A further object of my invention is therefore to provide a horseshoe with the weight so distributed as to give the horse's hoof a proper swing as it is moved forward in the action of walking.

Frequently in going along the streets and highways nails and other hard objects, such as glass, tin, sharp stones, etc., are stepped upon by the horse causing cuts and bruises to the sole of the hoof and sometimes penetrating to the tender interior of the hoof causing protracted lameness. At other times when traveling on clay roadways and on roadways covered with soft snow or other tenacious material, this clay, snow or other material, is collected in a hard lump in the hoof causing uncertain footing and final injury unless the lump is removed.

It is well known among horsemen that the horse's hoof is provided by nature with certain projections and depressions on its under surface at the heel, commonly called the frog, which forms a flexible and elastic cushion and a yielding connection between the sides of the hoof allowing it to expand as the weight is thrown on the hoof and contract as the weight is taken off. In order to act naturally, however, the projections of the frog must come in contact with some surface when the weight is thrown on the hoof, and in the case of high calks or projections under the heels of the shoe, this cannot occur.

The movement of the different structures within the hoof and the changes of form that occur at every step are indispensable to the health of the hoof, so that the elastic tissues of the frog may be kept active by regular exercise with protection against drying out of the hoof.

A still further object of my invention is therefore to provide a horseshoe so constructed as to protect the hoof from injury by entrance of foreign substances without interfering with the natural growth and functions of the different parts and conformations of the hoof.

A still further object of my invention is to provide a yielding tread for a horseshoe which may be pressed by the weight of the horse into intimate contact with the road surface thereby supporting a portion of the weight of the horse and protecting the calks or sharpened projections which are frequently used when the roadways are covered with ice, snow or other slippery material, from the too rapid wear to which they are subjected when forced to support the entire weight of the horse continually, whereas the calks should be protected in inverse proportion to the amount of force required to draw forward the load, the protection to the calks decreasing as the hoof is rocked forward to secure a firm foothold to draw a heavy load.

I attain these objects by the construction illustrated in the accompanying drawings in which:

Figure 1 is an elevation of a horse's hoof with a shoe embodying my invention nailed to the bottom thereof.

Fig. 2 is a bottom view of Fig. 1.

Fig. 3 is a cross section on the line 3—3 of Fig. 2.

Fig. 4 is a bottom view of the metal part of the shoe; and

Fig. 5 is a perspective view of the pad used in connection therewith.

Similar letters refer to similar parts throughout the several views.

The hoof A is provided with a metal shoe B of a shape conforming to the elliptical outline of the bottom of the hoof and having at C a cross-bar welded or otherwise permanently or removably secured to the shoe at the sides. The cross-bar C is located at a point nearer to the toe than the heel to provide a fulcrum on which the hoof may rock when tilted forward for a more firm foothold and at the same time to furnish a level and firm footing when the load or lack of it does not require the tilting forward of the hoof. The cross-bar C may project below the lower surface or tread of the shoe B, as shown, if desired, but would serve its purpose equally well if placed flush with the lower surface of the shoe B.

Interposed between the hoof A and the shoe B is a sole of rubber, leather, metal or other suitable material D, the metal shoe and the sole being adapted to be held in place by nails passing through holes distributed along the outer edge of the forward half of the shoe and sole and into the outer wall of the hoof.

On the lower surface of the sole D is attached a thick pad of resilient or yielding material E which projects downwardly through the opening formed between the toe part of the shoe B and the cross-bar C a sufficient distance below the lower surface of the crossbar C to come in contact with the traffic surface and permit of some expansion due to the pressure against the traffic surface.

The lower surface of the pad E may or may not have concave-faced projections or cups as shown at G in Figs. 1, 2 and 5, to produce a vacuum cup or suction grip against the traffic surface to furnish a more secure foothold.

The action of the pad is shown in Fig. 3, in which the line F represents the traffic surface, the hoof A being raised at the heel to secure a more firm foothold with the toe, the foot rocking on the cross-bar C or pad material, the weight being thrown on the resilient pad or projection E, causing it to spread or expand in close contact with the traffic surface, the friction produced preventing side motion of the foot. With the lower surface of the pad E cupped or concaved as at G, the pressure of the pad E against the traffic surface expels the air from the cups G, producing a suction sufficient to cause the pad to adhere more strongly to the traffic surface and materially adding to the security of the foothold.

The sole D being interposed between the hoof and the metal part of the shoe and covering the entire lower surface of the hoof, protects the hoof from injury by foreign substances met with on the roadways and in stable, and provides a surface against which the frog projections may act in a natural manner, thus preserving the natural and correct form of the hoof by providing it with protection and bearing surface.

The space H between the concave lower surface of the sole of the hoof and the false or artificial sole D of the shoe may be packed with oakum or other absorbent material and pitch or other material for the purpose of preventing the drying out of the hoof or for treating diseased or injured conditions.

The pad E and the cross-bar C may be made of a suitable size to secure a properly balanced hoof which will aid the muscles to swing the hoof forward to a new foothold.

The sole D, covering the bottom of the horse's hoof, in whole or in part prevents clay, mud, snow, ice, or other tenacious material from entering and wedging in the conformations of the frog and prevents the injuries frequently resulting therefrom.

The cross bar C, being placed immediately behind the pad E, serves to brace or reinforce the pad E when the horse is going down hills or inclined roadways and the loaded truck is tending to push the horse before it, the slipping tendency causing the pad E to be forced backward against the cross bar C.

My invention is not restricted to the precise construction and arrangement herein shown, which is an illustration of one practical embodiment of my invention; and those skilled in the art may make various modifications without departing from the spirit and scope of my invention as set forth in the following claims.

What I claim as new is:

1. In a horseshoe, the combination of a metal tread of suitable thickness and semi-elliptical plan view, with a pad of resilient or yielding material adapted to be secured between the horse's hoof and the metal tread having an integral projection extending downwardly near the toe, the lower surface of which extends below the tread surface of the metal member, the rearward side of said projection having a reinforcing bar adjacent thereto, said reinforcing bar being adapted to be removably connected at its ends to the sides of the metal member.

2. In a horseshoe, the combination of a metal tread of suitable thickness and semi-elliptical plan view having a cross-bar connecting the two sides of the shoe at a point nearer to the toe than to the heel, the lower surface of said cross-bar being below the lower surface of the semi-elliptical portion of the shoe, thus providing a fulcrum upon which the foot may rock and forming between the toe and said cross-bar a metal-surrounded opening with a suitably secured pad of resilient or yielding material extending therethrough, the lower surface of which extends below the tread surface of the metal member.

3. In a horseshoe, the combination of a metal tread of suitable thickness and semi-elliptical plan view having a cross-bar connecting the two sides of the shoe at a point nearer to the toe than to the heel, the lower surface of said cross-bar being below the lower surface of the semi-elliptical portion of the shoe, thus providing a fulcrum upon which the foot may rock and forming between the toe and said cross-bar a metal-surrounded opening with a suitably secured pad of resilient or yielding material extending therethrough, the lower surface of which extends below the tread surface of the metal member and having on its lower surface cavities or cup-shaped depressions.

4. In a horseshoe, the combination of a metal tread of suitable thickness and semi-elliptical plan view having a cross-bar connecting the two sides of the shoe at a point nearer to the toe than to the heel, the lower surface of said cross-bar being below the lower surface of the semi-elliptical portion of the shoe, thus providing a fulcrum upon which the foot may rock and forming between the toe and said cross-bar a metal-surrounded opening with a suitably secured pad of resilient or yielding material extending therethrough, the lower surface of which extends below the tread surface of the metal member, and having on its lower surface projections formed with cavities or cup-shaped depressions on their lower faces.

5. In a horseshoe, the combination of a metal tread of a suitable thickness and semi-elliptical plan view, having a cross bar connecting the two sides of the shoe at a point nearer to the toe than to the heel, forming between the toe and said cross bar a metal surrounded opening with a suitably secured pad of resilient or yielding material extending therethrough, the lower surface of which extends below the tread surface of the metal member having at its lower surface cavities or cup-shaped depressions.

6. In a horseshoe, the combination of a metal tread of a suitable thickness and semi-elliptical plan view, having a cross-bar connecting the two sides of the shoe at a point nearer to the toe than to the heel, forming between the toe and said cross-bar a metal-surrounded opening with a suitably secured pad of resilient or yielding material extending therethrough, the lower surface of which extends below the tread surface of the metal member and having on its lower surface projections formed with cavities or cup-shaped depressions on their lower faces.

7. In a horseshoe, the combination of a metal tread of suitable thickness and semi-elliptical plan view, having a cross-bar connecting the two sides of the shoe at a point nearer to the toe than to the heel, forming between the toe and said cross-bar a metal-surrounded opening and having a pad of resilient or yielding material extending therethrough and supported by a sole or plate adapted to cover the lower surface of the horse's hoof in the manner and for the purpose specified.

EDWARD C. KENNY.

Witnesses:
HARRY S. MARSH,
JESSIE M. KENNY.